(12) United States Patent
Myers

(10) Patent No.: US 6,811,633 B1
(45) Date of Patent: Nov. 2, 2004

(54) METHOD FOR BALANCING A VEHICLE DRIVESHAFT

(75) Inventor: Gerald L. Myers, Maumee, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 08/997,202

(22) Filed: Dec. 23, 1997

(51) Int. Cl.⁷ .............................................. B32B 31/00
(52) U.S. Cl. ................... 156/75; 156/275.7; 156/273.7; 156/307.3
(58) Field of Search .............................. 156/275.7, 75, 156/295, 310, 273.5, 273.7, 275.5, 307.1, 307.3, 297, 298, 299; 74/573 R; 464/180; 301/5.21

(56) References Cited

U.S. PATENT DOCUMENTS

| | | | |
|---|---|---|---|
| 1,943,658 A | * | 1/1934 | Dyckma ...................... 428/51 |
| 4,126,504 A | * | 11/1978 | Wolinski et al. ............. 156/310 |
| 4,293,363 A | * | 10/1981 | Wakabayashi et al. ....... 156/272 |
| 4,300,803 A | | 11/1981 | Chorosevic |
| 4,324,605 A | * | 4/1982 | Bethea ....................... 156/247 |
| 4,528,057 A | * | 7/1985 | Challenger et al. ........ 156/273.7 |
| 4,838,965 A | * | 6/1989 | Bussard ........................ 156/83 |
| 4,895,551 A | * | 1/1990 | Fritz ........................... 464/180 |
| 4,954,197 A | * | 9/1990 | Jedlicka et al. ........... 156/273.7 |
| 4,998,448 A | * | 3/1991 | Ellis, Jr. .................... 74/573 R |
| 5,064,494 A | * | 11/1991 | Duck et al. ............... 156/273.5 |
| 5,393,802 A | | 2/1995 | Horikawa |
| 5,435,720 A | * | 7/1995 | Riebschleger .................. 433/9 |
| 5,601,494 A | * | 2/1997 | Duggan ....................... 464/182 |
| 5,778,737 A | * | 7/1998 | Welsh et al. .............. 74/573 R |
| 5,875,171 A | * | 2/1999 | Albrecht et al. ............ 369/281 |

* cited by examiner

*Primary Examiner*—Gladys JP Corcoran
(74) *Attorney, Agent, or Firm*—MacMillan, Sobanski & Todd, LLC

(57) ABSTRACT

A method for rotatably balancing a driveshaft includes the initial step of using a conventional balancing apparatus is used to determined the size and location of the balance weights needed to properly balance the driveshaft. Next, an adhesive material is applied to either or both of the driveshaft and the balance weight. The balance weight is preferably formed having an inner surface that is curved to conform with the curvature of the outer surface of the driveshaft. The preferred balance weight is further formed having a relatively thin outer peripheral rim portion having a plurality of radially outwardly extending teeth formed thereon. The overall size of the balance weight may be varied to provide differing amounts of weight for facilitating the balancing process. A sufficient quantity of adhesive material is provided between the driveshaft and the balance weight such that when the balance weight is pressed against the driveshaft, at least a portion of the adhesive material is extruded outwardly into contact with at least a portion of the outer peripheral surface of the balance weight. The extruded portion of the adhesive material is then exposed to an accelerated curing process, such as ultraviolet radiation, heat, and the like, so as to cure at least that portion of the adhesive material to temporarily secure the balance weight to the driveshaft, thereby allowing the driveshaft to be immediately re-tested on the balancing apparatus to confirm that proper rotational balance has been achieved. The uncured first portion of the adhesive material located between the driveshaft and the balance weight 40 will later cure without the use of any accelerated curing process to permanently secure the balance weight to the driveshaft.

18 Claims, 4 Drawing Sheets

METHOD FOR BALANCING A VEHICLE DRIVESHAFT

BACKGROUND OF THE INVENTION

This invention relates in general to drive train assemblies for transferring rotational power from a source of rotational power to a rotatably driven device. In particular, this invention relates to an improved method for rotatably balancing a driveshaft adapted for use in a vehicular drive train assembly for transferring rotational power from an engine/transmission assembly to an axle assembly.

In most land vehicles in use today, a drive train assembly is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

Ideally, the driveshaft tube would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tubes usually contain variations in roundness, straightness, and wall thickness that result in minor imbalances when rotated at high speeds. To prevent such imbalances from generating undesirable noise or vibration, therefore, it is commonplace to counteract such imbalances by securing balance weights to selected portions of the driveshaft tube. The balance weights are sized and positioned to counterbalance the imbalances of the driveshaft tube such that it is balanced for rotation during use.

Traditionally, driveshaft tubes have been formed from steel or other metallic materials having relatively high melting temperatures. In such driveshaft tubes, welding has been commonly used to secure the balance weights thereto. More recently, however, driveshaft tubes have been formed from aluminum alloys and other metallic materials that are not well suited for welding, particularly in the high volume quantities usually associated with the vehicular manufacturing industry. Also, driveshaft tubes have recently been formed from composites and other materials that are not suited at all for welding.

To balance driveshaft tubes formed from these alternative materials, it has been proposed to use adhesive to secure the balance weights to the driveshaft tubes. Although adhesives are known that provide sufficient strength and durability to retain the balance weights on the driveshaft tube in the rugged environment of a vehicular drive train assembly, the use of such adhesives has not gain widespread acceptance. One of the reasons for this lack of acceptance is that the curing time for such adhesives is relatively long. As a result, an undesirably long time delay is usually encountered between the initial point in time at which the balance weight is applied to the driveshaft and the subsequent point in time at which the adhesive has cured to allow the driveshaft and balance weight assembly to be re-tested to confirm the achievement of proper balance. This undesirably long time delay prevents the efficient manufacture of the driveshaft tubes in the high volume quantities usually associated with the vehicular manufacturing industry. Thus, it would be desirable to provide an improved method for rotatably balancing a driveshaft adapted for use in a vehicular drive train assembly for transferring rotational power from an engine/transmission assembly to an axle assembly.

SUMMARY OF THE INVENTION

This invention relates to an improved method for rotatably balancing a driveshaft adapted for use in a vehicular drive train assembly for transferring rotational power from an engine/transmission assembly to an axle assembly. Initially, a conventional balancing apparatus is used to determined the size and location of the balance weights needed to properly balance the driveshaft. The determined location on the driveshaft is then cleaned so as to remove any contaminants therefrom. Next, an adhesive material is applied to either or both of the driveshaft and the balance weight. The adhesive material may, for example, be a multi-cure adhesive material including an adhesive portion and a curing activator portion. The balance weight is preferably formed having an inner surface that is curved to conform with the curvature of the outer surface of the driveshaft. The preferred balance weight is further formed having a serrated outer peripheral surface defined by a plurality of radially outwardly extending teeth and having a generally hat-shaped cross section including a relatively thick central portion and a relatively thin outer rim portion. The overall size of the balance weight may be varied to provide differing amounts of weight for facilitating the balancing process. A sufficient quantity of adhesive material is provided between the driveshaft and the balance weight such that when the balance weight is pressed against the driveshaft, at least a portion of the adhesive material is extruded outwardly into contact with at least a portion of the outer peripheral surface of the balance weight. The extruded portion of the adhesive material is then exposed to an accelerated curing process, such as ultraviolet radiation, heat, and the like, so as to cure at least that portion of the adhesive material to temporarily secure the balance weight to the driveshaft, thereby allowing the driveshaft to be immediately re-tested on the balancing apparatus to confirm that proper rotational balance has been achieved. The uncured first portion of the adhesive material located between the driveshaft and the balance weight will later cure without the use of any accelerated curing process to permanently secure the balance weight to the driveshaft.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
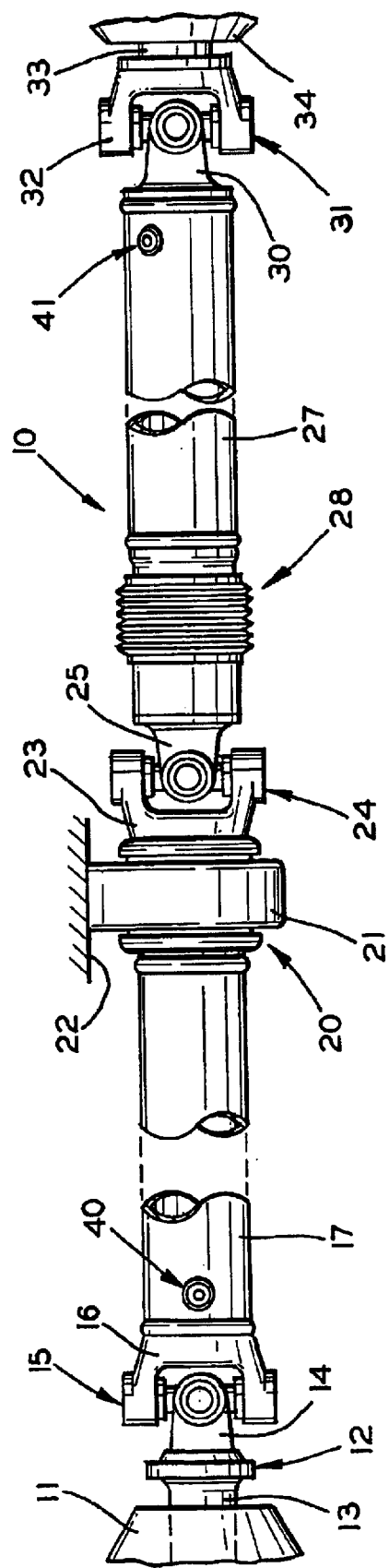
FIG. 1 is a side elevational view of a vehicle drive train assembly having a plurality of balance weights secured thereto in accordance with the method of this invention.

Referring now to the drawings, there is illustrated in FIG. 1 a drive train assembly, indicated generally at 10, for a vehicle that is adapted to transmit rotational power from an engine/transmission assembly 11 to a plurality of driven wheels (not shown). The engine/transmission assembly 11 is conventional in the art and includes an externally splined output shaft (not shown) that is connected to a first slip yoke assembly, indicated generally at 12. The first slip yoke assembly 12 is conventional in the art and includes an internally splined tubular end portion 13 that slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative thereto to a limited extent. The first slip yoke assembly 12 further includes a yoke 14 that forms one part of a first universal joint assembly, indicated generally at 15. The first universal joint assembly 15 is also conventional in the art and includes a tube yoke 16 that is connected to the yoke 14 by a cross in a known manner. The tube yoke 16 is secured, such as by bonding or welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of axial misalignment therebetween. Alternatively, the output shaft of the engine/transmission assembly 11 may terminate in a conventional end yoke (not shown) which is directly connected to the cross of the first universal joint assembly 15.

The first driveshaft section 17 extends through and is supported for rotation by a center bearing assembly, indicated generally at 20. The center bearing assembly 20 is conventional in the art and includes a rigid frame or bracket 21 which is secured to a portion of a frame, chassis, or body 22 of the vehicle. The center bearing assembly 20 further includes an annular bearing (not shown) for rotatably supporting the first driveshaft section 17 therein. The first driveshaft section 17 terminates in a second end including a end yoke 23, which forms one part of a second universal joint assembly, indicated generally at 24. The second universal joint assembly 24 is also conventional in the art and includes a yoke shaft 25 which is connected to the end yoke 23 by a cross in a known manner. The yoke shaft 25 is, in turn, connected through a second slip yoke assembly, indicated generally at 28, to a first end of a second driveshaft section 27. The second universal joint assembly 24 thus provides a rotational driving connection between the first driveshaft section 17 and the second driveshaft section 27, while permitting a limited amount of axial misalignment therebetween. The structure and operation of the second slip yoke assembly 28 is conventional in the art and forms no part of this invention.

The second driveshaft section 27 terminates in a second end having a tube yoke 30 secured thereto. The tube yoke 30 forms one part of a third universal joint assembly 31. The third universal joint assembly 31 is also conventional in the art and includes a tube yoke 32 that is connected to an input shaft 33 of an axle assembly 34 by a cross in a conventional manner. The third universal joint assembly 31 thus provides a rotational driving connection between the second driveshaft section 27 and the input shaft 33 of the axle assembly 34, while permitting a limited amount of axial misalignment therebetween. The axle assembly 34 is conventional in the art and is adapted to transmit rotational power from the input shaft 33 to the driven wheels of the vehicle in a known manner.

As is well known in the art, most driveshaft tubes, such as the driveshaft sections 17 and 27, usually contain variations in roundness, straightness, and wall thickness that result in minor imbalances when rotated at high speeds. To prevent such imbalances from generating undesirable noise or vibration, therefore, it is commonplace to counteract such imbalances by securing balance weights to selected portions of the driveshaft tube. Thus, as shown in FIG. 1, a first balance weight 40 is secured to the outer surface of the first driveshaft section 17. Similarly, a second balance weight 41 is secured to the outer surface of the second driveshaft section 27. The first and second balance weights 40 and 41 are sized and positioned to counterbalance the imbalances of the driveshaft sections 17 and 27 such that the drive train assembly 10 is balanced for rotation during use.

A conventional balancing apparatus (not shown) can be used to determined the size and location of the balance weights needed to properly balance the driveshaft sections 17 and 27 for rotation. Thus, for example, the driveshaft section 17 is initially placed in the balancing apparatus so that an appropriate size and location for applying the balancing weight 40 is determined. The determined location on the driveshaft section 17 is then cleaned so as to remove any contaminants therefrom, such as a layer of aluminum oxide that typically forms on the outer surface of aluminum alloy materials. Next, an adhesive material is applied to either or both of the driveshaft section 17 and the balance weight 40. Preferably, the adhesive material is a multi-cure, two-part material including an activator part 42 and an adhesive part 43, such as a 6000 Series adhesive material manufactured by Dymax Corporation. The term "multi-cure adhesive" is intended to refer to an adhesive material that can be cured by more than one curing process. However, this invention contemplates that any type of adhesive material may be used to secure the balance weight 40 to the outer surface of the driveshaft section 17.

Figure 2:
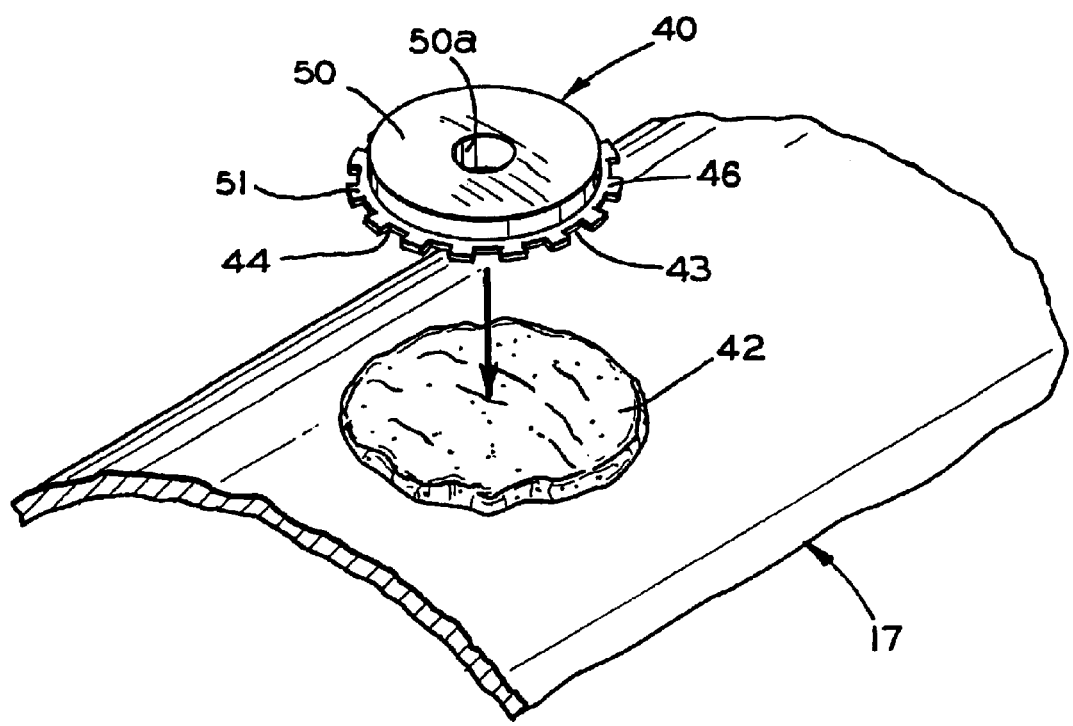
FIG. 2 is a perspective view illustrating of a portion of the vehicle drive train assembly illustrated in FIG. 1 showing the initial steps in the method of securing a balance weight to a driveshaft tube in accordance with this invention.
Figure 3:
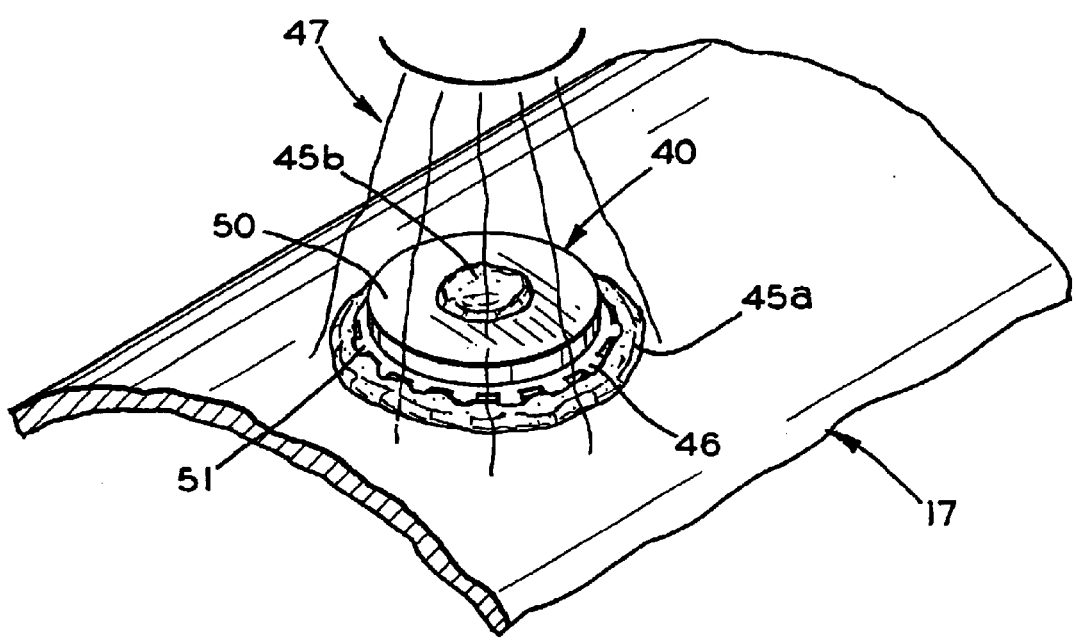
FIG. 3 is a perspective view similar to FIG. 2 showing the subsequent steps in the method of securing the balance weight to the driveshaft tube in accordance with this invention.
Figure 4:
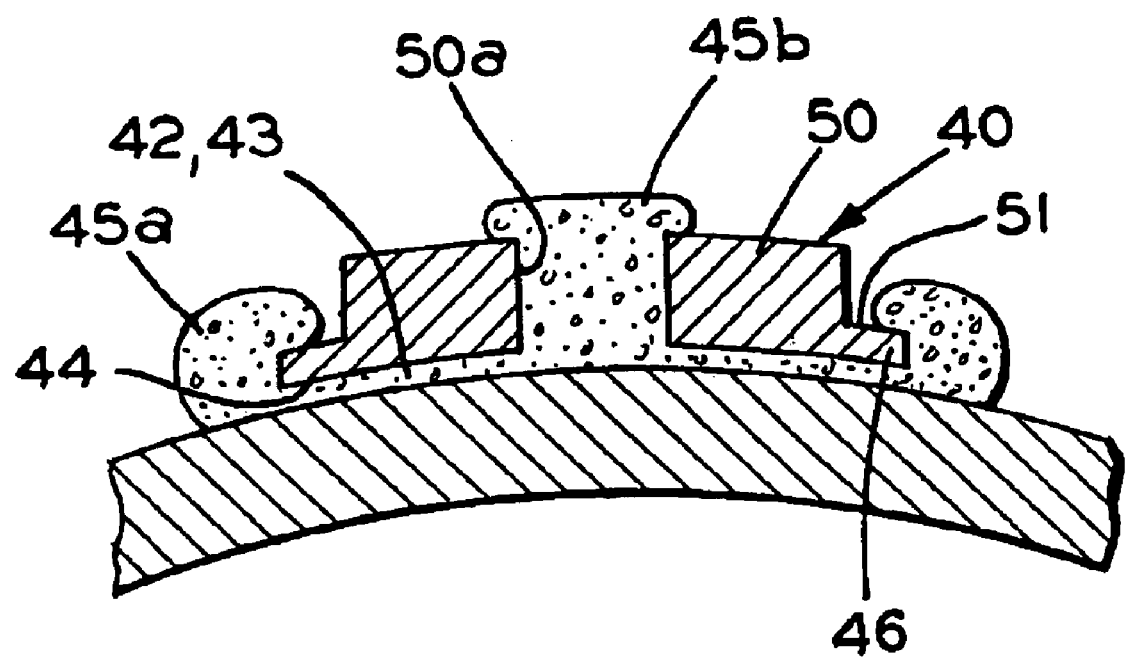
FIG. 4 is an enlarged sectional elevational view of a portion of the driveshaft tube and the balance weight illustrated in FIG. 3 showing the adhesive material slightly enveloping the brim of the hat-shaped balancing weight.
Figure 5:
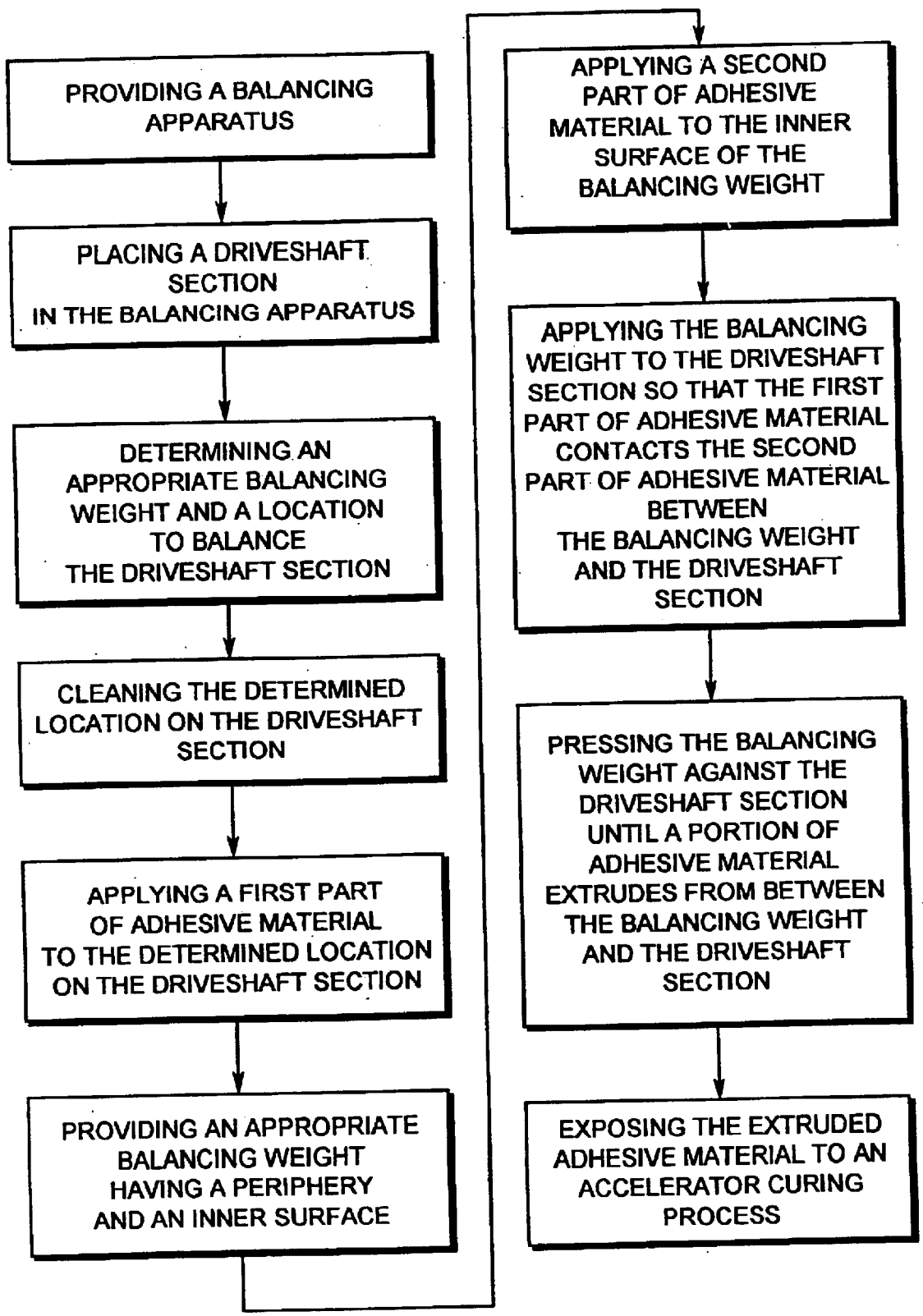
FIG. 5 is a flow chart illustrating the steps in the method of securing the balance weight to the driveshaft tube in accordance with this invention.

Although the balance weight 40 may have any desired structure, including those structures that are currently known in the art, the preferred structure of the balance weight 40 is illustrated in FIGS. 2, 3, and 4. As shown therein, the balance weight 40 includes an inner surface 44 that is preferably curved to conform with the curvature of the outer surface of the driveshaft section 17, although such is not required. The preferred balance weight 40 is further formed having a serrated outer peripheral surface defined by a plurality of radially outwardly extending teeth 46. Additionally, the balance weight 40 may be formed having a generally hat-shaped cross section including a relatively thick central portion 50 and a relatively thin outer rim portion 51. In this structure, the teeth 46 of the serrated outer peripheral surface are formed in the relatively thin outer rim portion 51 of the balance weight 40. The purpose for the teeth 46 and the relatively thin outer rim portion 51 will, be explained below. The overall size of the balance weight 40 may be varied to provide differing amounts of weight for facilitating the balancing process and for stress control in the adhesive material. If desired, a central aperture 50a may be formed through the central portion 50 of the balance weight 40 for a purpose that will be described below.

As shown in FIG. 2, the adhesive material is applied to either or both of the outer surface of the driveshaft section 17 and the inner surface 44 of the balance weight 40. For the illustrated two-part adhesive material, the activator part 42 of the adhesive material can be applied to the outer surface of the driveshaft section 17, while the adhesive part 43 can be applied to the inner surface 44 of the balance weight 40 (or vice versa). In any event, a sufficient quantity of adhesive material is provided between the driveshaft section 17 and the balance weight 40 such that when the balance weight 40 is pressed against the driveshaft section 17, a first portion 45a (see FIGS. 3 and 4) of the adhesive material is extruded outwardly from between the driveshaft section 17 and the balance weight 40. This first extruded portion 45a (often referred to as "squeeze-out") of the adhesive material is moved into contact with at least a portion of the outer peripheral surface of the balance weight 40. Thus, for the illustrated structure of the balance weight 40, the first extruded portion 45a of the adhesive material extends over and encapsulates the teeth 46 of the relatively thin rim portion 51 of the balance weight 40. The teeth 46 of the relatively thin rim portion 51 thus facilitate a relatively large surface area of engagement and encapsulation between the first extruded portion 45a of the adhesive material and the outer peripheral surface of the balance weight 40. Similarly, a second portion 45b of the (see FIGS. 3 and 4) of the adhesive material is extruded outwardly through the aperture 50a formed through the central portion 50 of the balance weight 40. This second extruded portion 45b of the adhesive material extends over and into contact with at least a portion of the upper surface of the balance weight 40.

Thus, as best shown in FIG. 4, when the balance weight 40 is pressed against the driveshaft section 17, some of the adhesive material remains between the inner surface 44 of the balance weight 40 and the outer surface of the driveshaft section 17. At the same time, however, a first portion 45a of the adhesive material is extruded outwardly to extend between the outer peripheral surface of the balance weight 40 and the driveshaft section 17, while a second portion 45b of the adhesive material is extruded upwardly through the aperture 50a to extend partially over the outer surface of the balance weight 40. The first and second extruded portions 45a and 45b of the adhesive material are then exposed to an accelerated curing process so as to cure at least those portions 45a and 45b of the adhesive material to temporarily secure the balance weight 40 to the driveshaft section 17. For example, the extruded portions 45a and 45b of the adhesive material 40 may be exposed to ultraviolet radiation 47, as shown in FIG. 4, for a relatively short period of time (five to ten seconds) to effect the rapid curing thereof. Ultraviolet radiation is a preferred accelerated curing process because it does not cause undesirable localized heating of the driveshaft section 17. However, any other accelerated curing process, such as heat, chemicals, and the like, may be used to effect the rapid curing of the extruded portions 45a and 45b of the balance weight 40.

The result of this accelerated curing process is that the first and second extruded portions 45a and 45b of the adhesive material are sufficiently cured to temporarily secure the balance weight 40 to the first driveshaft section 17. The first extruded portion 45a of the adhesive material is cured to bond the teeth 46 of the relatively thin rim portion 51 of the balance weight 40 to the outer surface of the first driveshaft section 17. The second extruded portion 45b of the adhesive material is cured to bond the interior portions thereof (located within the aperture 50a) and the outer surface of the balance weight 40 to the outer surface of the first driveshaft section 17. Also, the second extruded portion 45b of the adhesive material extending over the outer surface of the balance weight 40 is hardened so as to mechanically retain the balance weight 40 to the outer surface of the first driveshaft section 17 in the nature of a rivet.

Consequently, the balance weight 40 is sufficiently secured to the driveshaft section 17 to permit the driveshaft section 17 to be immediately re-tested on the balancing apparatus to confirm that proper rotational balance has been achieved. If the proper rotational balance has been achieved, the driveshaft section 17 is removed from the balancing apparatus for subsequently installation in a vehicle. Inasmuch as a relatively long period of time usually passes between the conclusion of the balancing process and installation on the vehicle, the uncured portion of the adhesive material (located between the driveshaft section 17 and the balance weight 40) will have sufficient time to cure without the use of any accelerated curing process. Thus, by the time the driveshaft section 17 is installed on the vehicle, the entire amount of the adhesive material will be cured, and the balance weight 40 will be permanently secured to the driveshaft section 17. If re-testing of the driveshaft section 17 indicates that further balancing is required, additional balance weights can be secured to the driveshaft section 17 in the same manner as described above.

Although this invention has been described and illustrated in the context of a vehicular drive train assembly 10 having multiple driveshaft sections 17 and 27, it will be appreciated that this invention may be practiced in a vehicular drive train assembly having only a single driveshaft tube. It will be further appreciated that this invention is not limited to vehicular driveshaft tube applications, but rather may be practiced on any type of driveshaft structure for transferring rotational power from a source of rotational power to a rotatably driven device. Lastly, it should be understood that both of the first and second extruded portions 45a and 45b of the adhesive material need not be simultaneously provided. Rather, either the first extruded portion 45a or the second extruded portion 45b may be provided individually to sufficiently secure the balance weight 40 to the driveshaft section 17 to confirm that proper rotational to balance has been achieved.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a driveshaft for use in a vehicular drive train assembly that is balanced for rotation about an axis comprising the steps of:
   (a) providing an unbalanced driveshaft;
   (b) providing a balance weight having a serrated outer peripheral surface;
   (c) providing an adhesive material between the unbalanced driveshaft and the balance weight;
   (d) moving the unbalanced driveshaft and the balance weight toward one another such that a first portion of the adhesive material is disposed between the unbalanced driveshaft and the balance weight at a location for balancing the unbalanced driveshaft for rotation about an axis and a second portion of the adhesive material extends from between the unbalanced driveshaft and the serrated outer peripheral surface of the balance weight;

(e) initially curing the second portion of the adhesive material to temporarily retain the balance weight on the unbalanced driveshaft; and (f) subsequently curing the first portion of the adhesive material to permanently retain the balance weight on the unbalanced driveshaft.

2. The method defined in claim 1 wherein the balance weight is also formed having a relatively thin rim portion, and wherein the second portion of the adhesive material extends between the unbalanced driveshaft and the relatively thin rim portion of the balance weight.

3. The method defined in claim 1 wherein the unbalanced driveshaft has an outer surface defining a shape, and wherein the balance weight has an inner surface defining a shape that corresponds to the outer surface of the unbalanced driveshaft.

4. The method defined in claim 1 wherein the unbalanced driveshaft and the balance weight are pressed against one another such that the first portion of the adhesive material is disposed between the unbalanced driveshaft and the balance weight and the second portion of the adhesive material is extruded outwardly from between the unbalanced driveshaft and the balance weight such that the second portion of the adhesive material extends from between the unbalanced driveshaft and the balance weight.

5. The method defined in claim 1 wherein the accelerated curing process is ultraviolet radiation.

6. The method defined in claim 1 wherein the accelerated curing process is heat.

7. The method defined in claim 1 wherein the adhesive material includes an activator part that is applied to one of the unbalanced driveshaft and the balance weight and an adhesive part that is applied to the other of the unbalanced driveshaft and the balance weight.

8. The method defined in claim 1 wherein the unbalanced driveshaft has an outer surface, the balance weight has an inner surface disposed adjacent to the outer surface of the unbalanced driveshaft, the balance weight has an outer surface opposite the inner surface, and the second portion of the adhesive material extends from between the unbalanced driveshaft and the outer surface of the balance weight.

9. The method defined in claim 1 wherein the balance weight has an aperture formed therethrough from an inner surface disposed adjacent to the unbalanced driveshaft to an outer surface, and the second portion of the adhesive material extends through the aperture and over a portion of the outer surface of the balance weight.

10. A method of manufacturing a driveshaft for use in a vehicular drive train assembly that is balanced for rotation about an axis comprising the steps of:

(a) providing an unbalanced driveshaft;

(b) providing a balance weight having a relatively thin rim portion;

(c) providing an adhesive material between the unbalanced driveshaft and the balance weight;

(d) moving the unbalanced driveshaft and the balance weight toward one another such that a first portion of the adhesive material is disposed between the unbalanced driveshaft and the balance weight at a location for balancing the unbalanced driveshaft for rotation about an axis and a second portion of the adhesive material extends from between the unbalanced driveshaft and the relatively thin rim portion of the balance weight;

(e) initially curing the second portion of the adhesive material to temporarily retain the balance weight on the unbalanced driveshaft; and (f) subsequently curing the first portion of the adhesive material to permanently retain the balance weight on the unbalanced driveshaft.

11. The method defined in claim 10 wherein the balance weight is also formed having a serrated outer peripheral surface, and wherein the second portion of the adhesive material extends between the unbalanced driveshaft and the serrated outer peripheral surface of the balance weight.

12. The method defined in claim 10 wherein the unbalanced driveshaft has an outer surface defining a shape, and wherein the balance weight has an inner surface defining a shape that corresponds to the outer surface of the unbalanced driveshaft.

13. The method defined in claim 10 wherein the unbalanced driveshaft and the balance weight are pressed against one another such that the first portion of the adhesive material is disposed between the unbalanced driveshaft and the balance weight and the second portion of the adhesive material is extruded outwardly from between the unbalanced driveshaft and the balance weight such that the second portion of the adhesive material extends from between the unbalanced driveshaft and the balance weight.

14. The method defined in claim 10 wherein the accelerated curing process is ultraviolet radiation.

15. The method defined in claim 10 wherein the accelerated curing process is heat.

16. The method defined in claim 10 wherein the adhesive material includes an activator part that is applied to one of the unbalanced driveshaft and the balance weight and an adhesive part that is applied to the other of the unbalanced driveshaft and the balance weight.

17. The method defined in claim 10 wherein the unbalanced driveshaft has an outer surface, the balance weight has an inner surface disposed adjacent to the outer surface of the unbalanced driveshaft, the balance weight has an outer surface opposite the inner surface, and the second portion of the adhesive material extends from between the unbalanced driveshaft and the outer surface of the balance weight.

18. The method defined in claim 10 wherein the balance weight has an aperture formed therethrough from an inner surface disposed adjacent to the unbalanced driveshaft to an outer surface, and the second portion of the adhesive material extends through the aperture and over a portion of the outer surface of the balance weight.

* * * * *